US011867081B1

(12) United States Patent
Twahir et al.

(10) Patent No.: US 11,867,081 B1
(45) Date of Patent: Jan. 9, 2024

(54) TURBINE BLADE AIRFOIL PROFILE

(71) Applicant: PRATT & WHITNEY CANADA CORP., Longueuil (CA)

(72) Inventors: Abdulhalim Twahir, La Prairie (CA); Panagiota Tsifourdaris, Montreal (CA); Daniel Lecuyer, St-Bruno (CA); Masoud Roshan Fekr, Saint-Lambert (CA); Stephane Bigras, Boucherville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/159,781

(22) Filed: Jan. 26, 2023

(51) Int. Cl.
*F01D 5/14* (2006.01)
*F01D 9/04* (2006.01)

(52) U.S. Cl.
CPC .......... *F01D 5/141* (2013.01); *F05D 2240/24* (2013.01); *F05D 2240/301* (2013.01); *F05D 2240/303* (2013.01); *F05D 2240/304* (2013.01); *F05D 2250/74* (2013.01)

(58) Field of Classification Search
CPC ........ F01D 5/141; F01D 9/041; F04D 29/324; F04D 29/544; F05D 2220/30; F05D 2220/32; F05D 2240/12; F05D 2250/74
See application file for complete search history.

(56) References Cited

U.S. PATENT DOCUMENTS 6,398,489 B1 6/2002 Burdgick et al.
6,503,054 B1 * 1/2003 Bielek .................... F01D 5/141 415/191
6,685,434 B1 * 2/2004 Humanchuk .......... F01D 5/141 416/DIG. 2
6,779,980 B1 * 8/2004 Brittingham ........... F01D 5/187 416/243
6,832,897 B2 12/2004 Urban
6,854,961 B2 2/2005 Zhang et al.
6,910,868 B2 6/2005 Tyde et al.
7,063,509 B2 * 6/2006 Snook .................... F01D 5/141 416/189
7,249,933 B2 * 7/2007 Lee ........................ F01D 5/143 416/193 A
7,306,436 B2 12/2007 Girgis et al.
7,351,038 B2 4/2008 Girgis et al.
7,354,249 B2 4/2008 Girgis et al.
7,367,779 B2 5/2008 Girgis et al.
7,402,026 B2 7/2008 Girgis et al.
7,467,920 B2 * 12/2008 Sullivan ................. F01D 5/141 416/243
7,520,726 B2 4/2009 Papple et al.
7,520,727 B2 4/2009 Sreekanth et al.
(Continued)

*Primary Examiner* — Brian Christopher Delrue
(74) *Attorney, Agent, or Firm* — NORTON ROSE FULBRIGHT CANADA LLP.

(57) ABSTRACT

A turbine blade for a gas turbine engine has an airfoil including leading and trailing edges joined by spaced-apart pressure and suction sides to provide an external airfoil surface extending from a platform in a spanwise direction to a tip. The external airfoil surface is formed in substantial conformance with multiple cross-sectional profiles of the airfoil defined by a set of Cartesian coordinates set forth in Table 1, the Cartesian coordinates provided by an axial coordinate scaled by a local axial chord, a circumferential coordinate scaled by a local axial chord, and a span location.

20 Claims, 5 Drawing Sheets

(56) References Cited

U.S. PATENT DOCUMENTS

| | | | |
|---|---|---|---|
| 7,520,728 | B2 | 4/2009 | Sleiman et al. |
| 7,534,091 | B2 | 5/2009 | Ravanis et al. |
| 7,537,432 | B2 | 5/2009 | Marini et al. |
| 7,537,433 | B2 | 5/2009 | Girgis et al. |
| 7,559,746 | B2 | 7/2009 | Tsifourdaris et al. |
| 7,559,747 | B2 | 7/2009 | Mohan et al. |
| 7,559,748 | B2 | 7/2009 | Kidikian et al. |
| 7,559,749 | B2 | 7/2009 | Kidikian et al. |
| 7,566,200 | B2 | 7/2009 | Marini et al. |
| 7,568,889 | B2 | 8/2009 | Mohan et al. |
| 7,568,890 | B2 | 8/2009 | Findlay et al. |
| 7,568,891 | B2 | 8/2009 | Mohan et al. |
| 7,611,326 | B2 | 11/2009 | Trindade et al. |
| 7,625,182 | B2 | 12/2009 | Mah et al. |
| 7,625,183 | B2 | 12/2009 | Tsifourdaris et al. |
| 7,632,074 | B2 | 12/2009 | Ravanis et al. |
| 8,100,659 | B2 | 1/2012 | Marini |
| 8,105,043 | B2 | 1/2012 | Tsifourdaris |
| 8,105,044 | B2 | 1/2012 | Marini et al. |
| 8,807,950 | B2 * | 8/2014 | Bielek ..................... F01D 5/142 416/243 |
| 9,957,805 | B2 * | 5/2018 | Soni .......................... F01D 5/20 |
| 10,087,952 | B2 * | 10/2018 | Dutka ..................... F01D 5/141 |
| 10,533,440 | B2 * | 1/2020 | Brozyna ................. F01D 9/041 |
| 2005/0079061 | A1 | 4/2005 | Beddard |
| 2008/0124219 | A1 | 5/2008 | Kidikian et al. |
| 2009/0097982 | A1 | 4/2009 | Saindon et al. |
| 2009/0116967 | A1 | 5/2009 | Sleiman et al. |
| 2010/0008784 | A1 | 1/2010 | Shafique et al. |
| 2011/0229317 | A1 | 9/2011 | Marini |
| 2011/0236214 | A1 | 9/2011 | Tsifourdaris |
| 2011/0243747 | A1 | 10/2011 | Marini |
| 2011/0243748 | A1 | 10/2011 | Tsifourdaris |
| 2011/0262279 | A1 | 10/2011 | Marini |
| 2016/0115797 | A1 | 4/2016 | Calla |
| 2020/0232328 | A1 | 7/2020 | Song |

* cited by examiner

TURBINE BLADE AIRFOIL PROFILE

TECHNICAL FIELD

The disclosure relates generally to gas turbine engines and, more particularly, to an airfoil that may be incorporated into a gas turbine engine.

BACKGROUND OF THE ART

Every compressor and turbine stage of a gas turbine engine must meet a plurality of design criteria to assure the best possible overall engine efficiency. The design goals dictate specific thermal and mechanical requirements that must be met pertaining to heat loading, parts life and manufacturing, use of combustion gases, throat area, vectoring, the interaction between stages to name a few. The design criteria for each stage is constantly being re-evaluated and improved upon. Each airfoil is subject to flow regimes which lend themselves easily to flow separation, which tend to limit the amount of work transferred to the compressor, and hence the total power capability of the engine. Therefore, improvements in airfoil design are sought.

SUMMARY

In one aspect, there is provided a turbine blade for a gas turbine engine, the turbine blade comprising an airfoil including a leading edge and a trailing edge joined by a pressure side and a suction side to provide an external airfoil surface extending from a platform in a spanwise direction to a tip. The external airfoil surface is formed in substantial conformance with multiple cross-sectional profiles of the airfoil defined by a set of Cartesian coordinates set forth in Table 1, the set of Cartesian coordinates provided by an axial coordinate scaled by a local axial chord, a circumferential coordinate scaled by the local axial chord, and a span location, wherein the local axial chord corresponds to a width of the airfoil between the leading and trailing edges at the span location.

In another aspect, there is provided a gas turbine engine comprising a low pressure turbine. The low pressure turbine is configured to drive a low pressure compressor. The low pressure turbine comprises at least one stage of turbine blades, wherein at least one of the turbine blades of the at least one stage comprises an airfoil having leading and trailing edges joined by spaced-apart pressure and suction sides to provide an external airfoil surface extending from a platform in a span direction to a tip. The external airfoil surface is formed in substantial conformance with multiple cross-section profiles of the airfoil defined by a set of Cartesian coordinates set forth in Table 1. The set of Cartesian coordinates are provided by an axial coordinate scaled by a local axial chord, a circumferential coordinate scaled by the local axial chord, and a span location, wherein the local axial chord corresponds to a width of the airfoil between the leading and trailing edges at the span location.

In a further aspect, there is provided a low pressure turbine blade comprising: a platform and an airfoil extending in a spanwise direction from the platform to a tip. The airfoil has an external airfoil surface formed in substantial conformance with multiple cross-section airfoil profiles defined by the set of Cartesian coordinates provided in Table 1.

DESCRIPTION OF THE DRAWINGS

Reference is now made to the accompanying figures in which.

DETAILED DESCRIPTION

Figure 1:
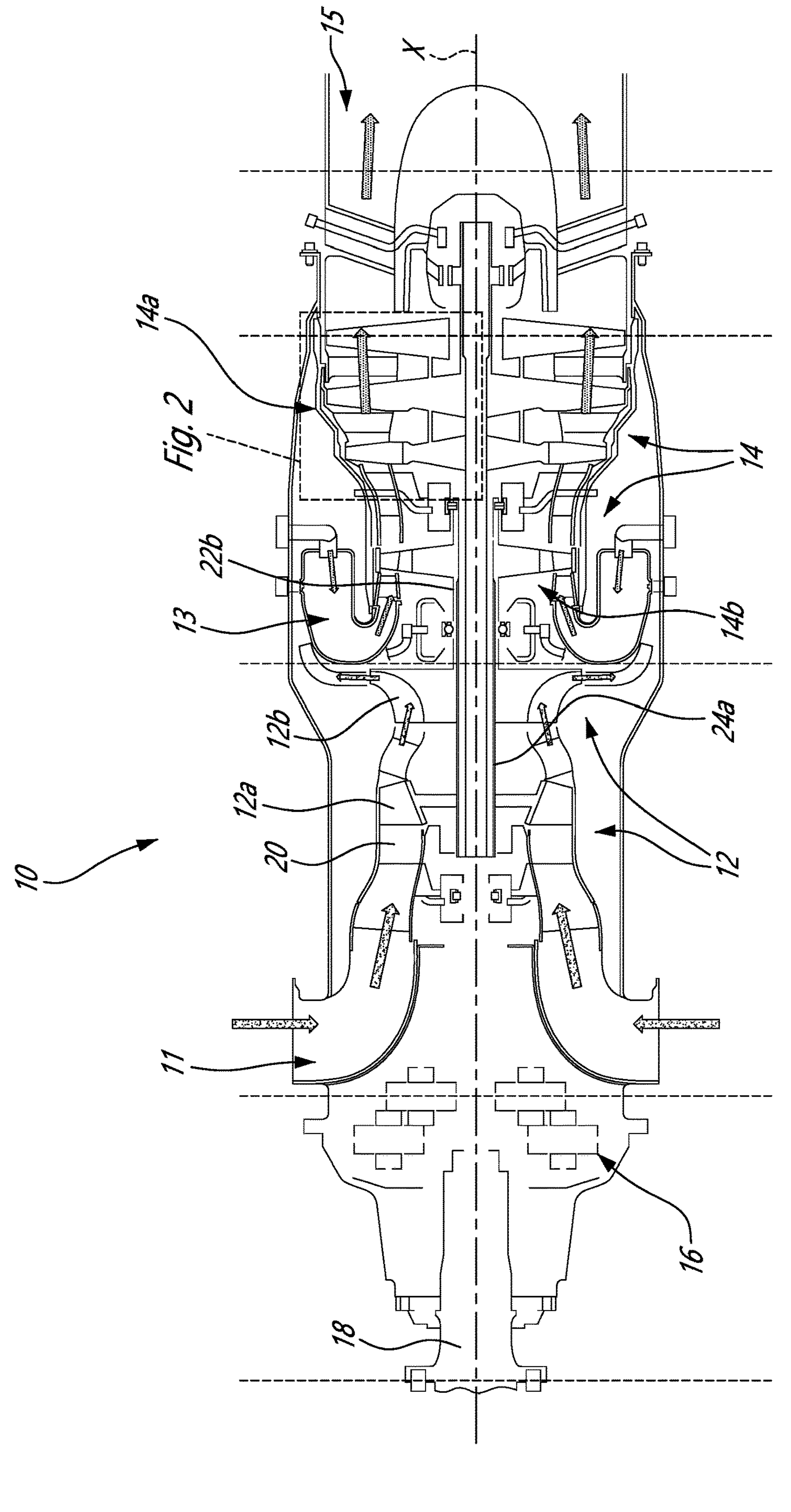
FIG. 1 is a schematic cross-section view of a gas turbine engine.

FIG. 1 illustrates an example of a gas turbine engine 10 of a type preferably provided for use in subsonic flight, generally comprising in serial flow communication an air inlet 11, a compressor 12 for pressurizing the air from the air inlet 11, a combustor 13 in which the compressed air is mixed with fuel and ignited for generating an annular stream of hot combustion gases, a turbine 14 for extracting energy from the combustion gases, and an exhaust 15 through which the combustion gases exit the engine 10. According to the illustrated exemplary engine, the turbine 14 is drivingly connected to an input end of a reduction gearbox RGB 16. The RGB 16 has an output end drivingly connected to an output shaft 18 configured to drive a rotatable load (not shown). The rotatable load can, for instance, take the form of a propeller or a rotor, such as a helicopter main rotor. Still according to the illustrated embodiment, all the compressor and the turbine rotors are mounted in-line for rotation about the engine centerline X. However, it is understood that the turbine and compressor rotors could have different rotation axes. Also, it is understood that the concepts described herein are not limited to use with turboprop or turboshaft engines as the teachings may be applied to other types of turbine engines including various engine architectures and hybrid engine configurations. Furthermore, while the illustrated exemplary engine is a two-spool engine, it is understood that the engine could include a different number of spools. For instance, the engine could have 1 to 3 spools.

The exemplified engine 10 has an axially extending central core which defines an annular gaspath 20 through which gases flow, as depicted by flow arrows in FIG. 1. The exemplary embodiment shown in FIG. 1 is a "through flow" engine because gases flow through the gaspath 20 from the air inlet 11 at a front portion of the engine 10, to the exhaust 15 at a rear portion thereof. However, it is understood that the engine 10 could adopt different configurations, including a reverse flow configuration, the engine configuration illustrated in FIG. 1 being provided for illustrative purposes only.

The terms "upstream" and "downstream" used herein refer to the direction of an air/gas flow passing through the gaspath 20 of the engine 10. It should also be noted that the terms "axial", "radial", "angular" and "circumferential" are used with respect to the rotation axes of the turbine and compressor rotors (i.e. the engine centerline X in the exemplary engine).

According to the illustrated embodiment, the turbine 14 comprises a low pressure (LP) turbine 14*a* and a high pressure (HP) turbine 14*b*. The HP turbine 14*b* is drivingly connected to an HP compressor 12*b* via an HP shaft 22*b*. The HP turbine 14*b*, the HP shaft 22*b* and the HP compressor 12*b* form one of the two spools of the engine 10, namely the HP spool. According to the illustrated embodiment, the HP turbine 14*b* and the HP compressor 12*b* each have a single stage of rotating blades. However, it is understood that the HP turbine 14*b* and the HP compressor 12*b* could have any suitable number of stages.

Still according to the illustrated embodiment, the LP turbine 14*a* is drivingly connected to an LP compressor 12*a* via an LP shaft 24*a*. The LP turbine 14*a*, the LP shaft 24*a* and the LP compressor 12*a* form the other one of the two spools of the engine 10, namely the LP spool. The HP spool and the LP spool are independently rotatable. According to the illustrated embodiment, the LP turbine 14*a* has three stages of turbine blades, whereas the LP compressor 12*a* has a single stage of LP compressor blades. However, it is understood that the LP turbine 14*a* and the LP compressor 12*a* could have any suitable number of stages. For instance, according to one embodiment, the LP turbine 14*a* is a two stage LP turbine.

The LP shaft 24*a* is drivingly connected to the input end of the RBG 16 to drive the output shaft 18. Accordingly, the LP turbine 14*a* (also known as the power turbine) can be used to drive both the LP compressor 12*a* and the output shaft 18. An additional gearbox or the like (not shown) can be provided between the LP compressor 12*a* and the LP turbine 14*a* to allow the LP compressor 12*a* to rotate at a different speed from the LP turbine 14*a*.

In use, the air flowing through the inlet 11 is compressed by the LP compressor 12*a* then the HP compressor 12*b*, mixed and burned with fuel in the combustor 13, then expanded over the HP turbine 14*b* and the LP turbine 14*a* before being discharged through the exhaust 15. The HP turbine 14*b* drives the HP compressor 12*b*, whereas the LP turbine 14*a* drives the LP compressor 12*a* and the output shaft 18.

Figure 2:
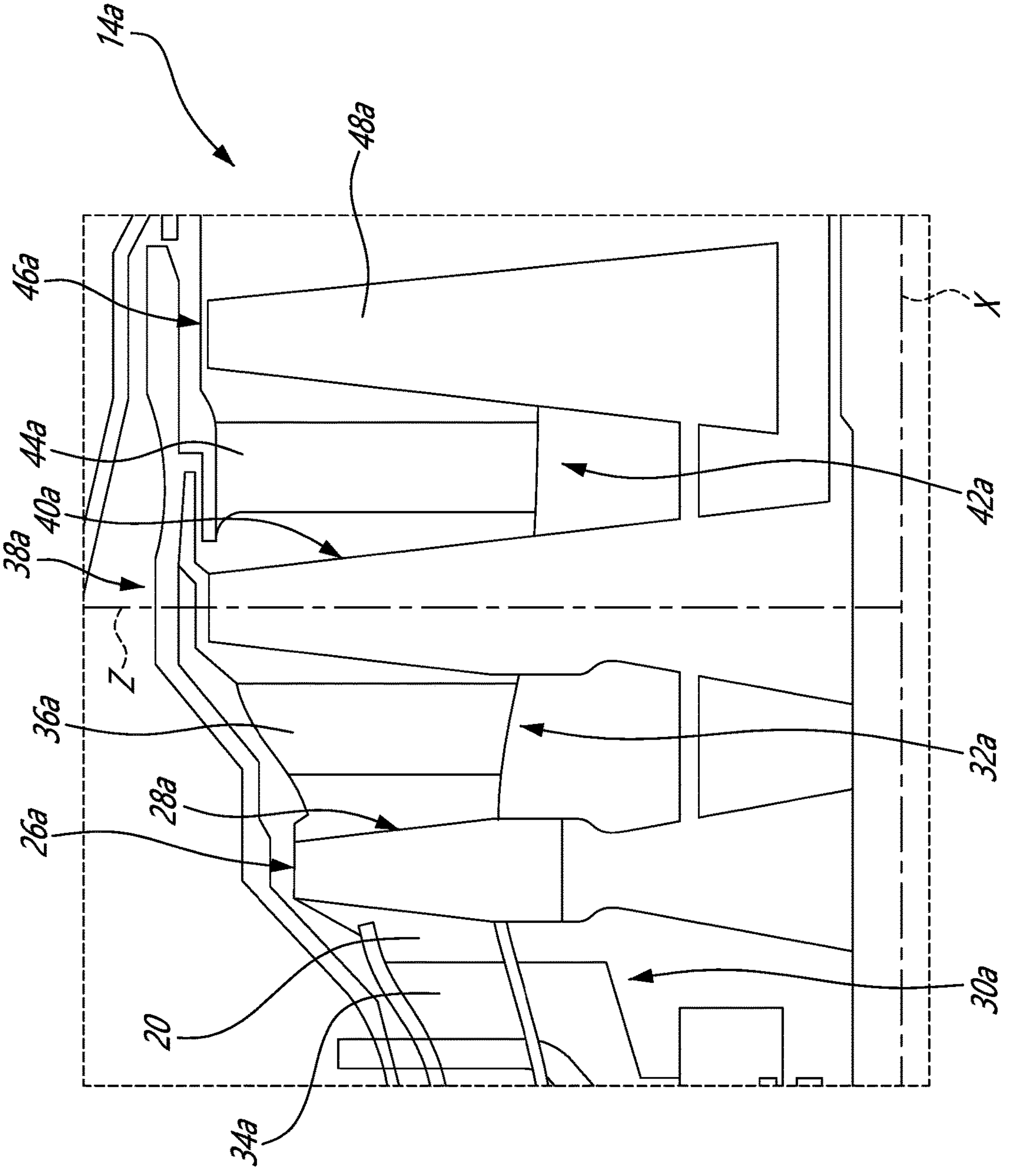
FIG. 2 is a cross-section side view of a low pressure (LP) turbine section of the gas turbine engine shown in FIG. 1.

Referring to FIG. 2, it can be appreciated that the LP turbine 14*a* comprises series of rotating blades and stationary vanes that extends into the gaspath 20 of the engine 10. In the exemplary LP turbine 14*a*, first, second and third arrays of circumferentially spaced-apart stationary vanes are axially spaced-apart from one another along the axis X. A first stage array 26*a* of circumferentially spaced-apart LP turbine blades 28*a* is disposed axially between the first and second arrays 30*a*, 32*a* of turbine vanes 34*a*, 36*a*. A second stage array 38*a* of circumferentially spaced-apart LP turbine blades 40*a* is disposed axially between the second and third arrays 32*a*, 42*a* of turbine vanes 36*a*, 44*a*. A third stage array 46*a* of circumferentially spaced-apart LP turbine blades 48*a* is disposed downstream of the third array 42*a* of stationary turbine vanes 44*a*. The second stage LP turbine blades 40*a* are mounted in position along a stacking line corresponding to axis Z in FIG. 2. The stacking line defines the axial location (x) where the blades 40*a* are mounted along the centerline of the engine 10.

Figure 3A:
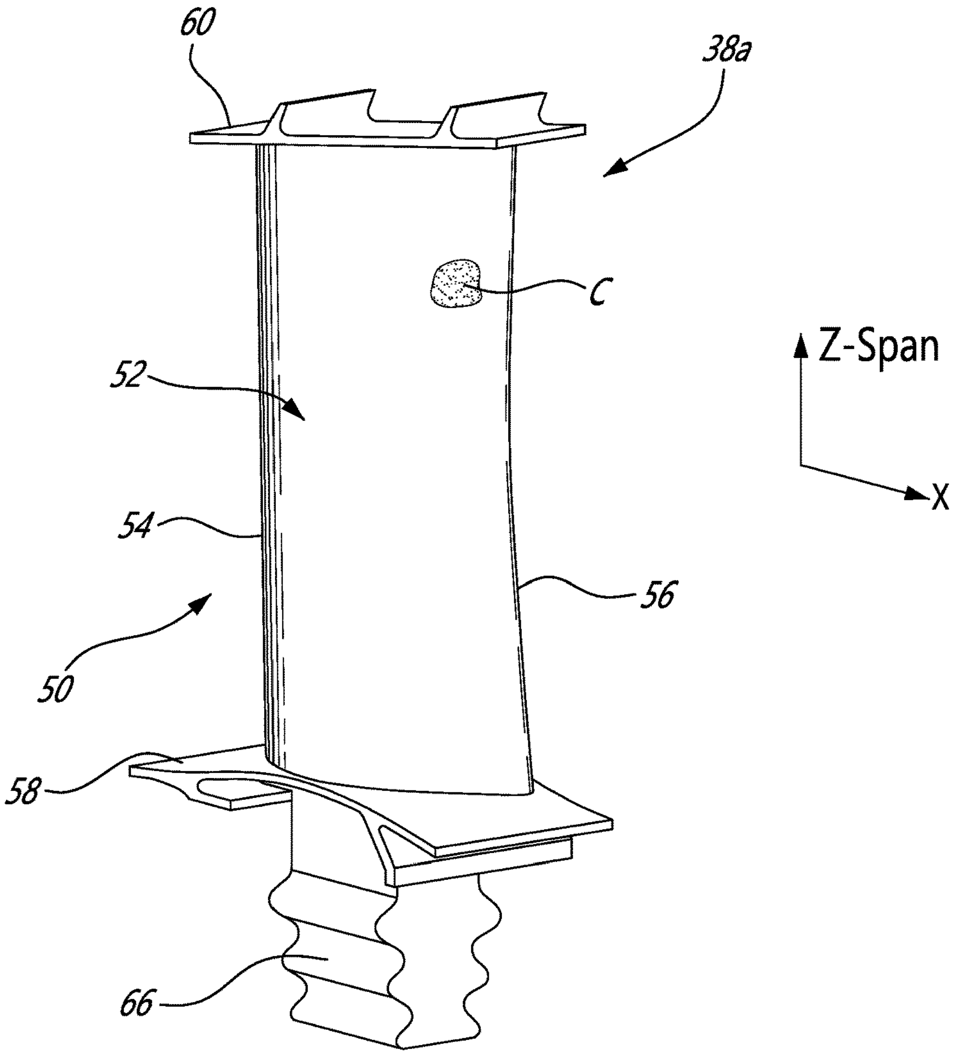
FIG. 3*a* is an isometric view of a shrouded LP turbine blade.
Figure 3B:
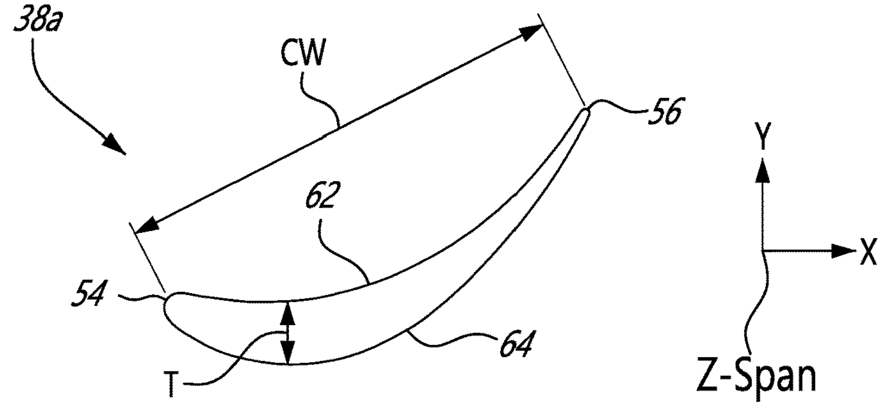
FIG. 3*b* is a plan, top view of a representative airfoil cross-section along a span of the blade shown in FIG. 3*a* and illustrating directional references.

FIGS. 3*a* and 3*b* schematically illustrate an example of a shrouded LP turbine blade suitable for use as a first, second, third, fourth or fifth stage LP turbine blade. According to the illustrated example, the LP turbine blade is a second stage LP turbine blade of a 3-stage LP turbine. It can be seen that the second stage LP turbine blade 40*a* includes an airfoil 50 having an exterior/external surface 52 extending in a chordwise direction CW between a leading edge 54 and a trailing edge 56 and in a spanwise direction Z from a platform 58 to a shrouded tip 60. The airfoil 50 is provided between pressure and suction sides 62, 64 in an airfoil thickness direction T, which is generally perpendicular to the chordwise direction CW. A root 66 depends radially inwardly from the platform 58 for detachably mounting the blade 40*a* to a rotor disk. It is however understood that the turbine blade 40*a* could be integrally formed with the disk. In such a configuration, the root is eliminated and the platform is provided at the outer diameter of the rotor disk.

Figure 4C:
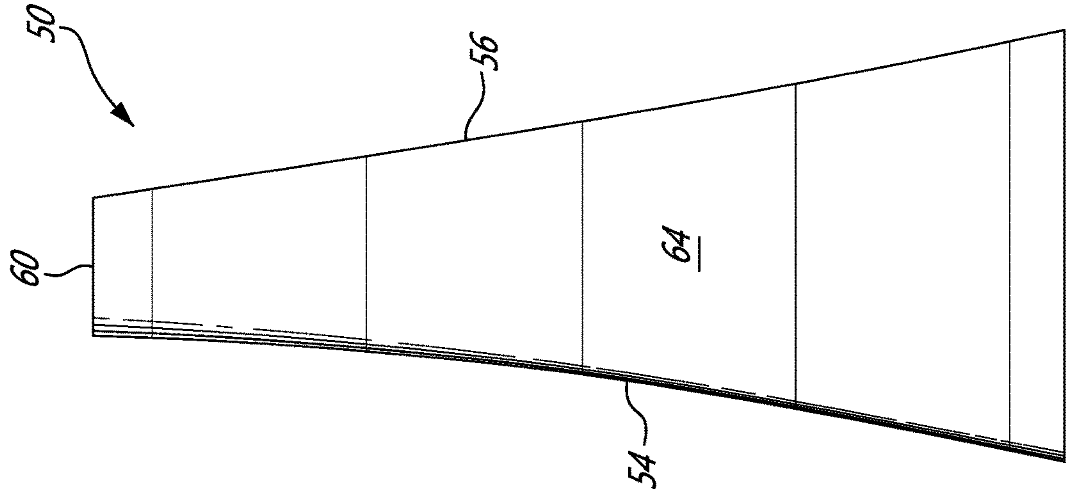
FIG. 4*c* is a suction side view of the exemplary turbine airfoil shown in FIG. 4*a*.
Figure 4B:
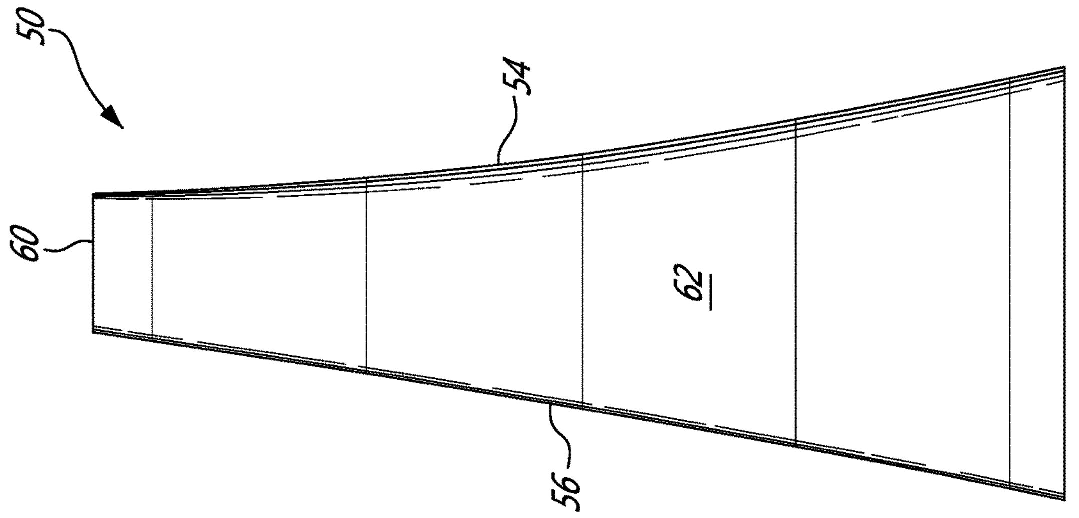
FIG. 4*b* is a pressure side view of the exemplary turbine airfoil shown in FIG. 4*a;*
Figure 4A:
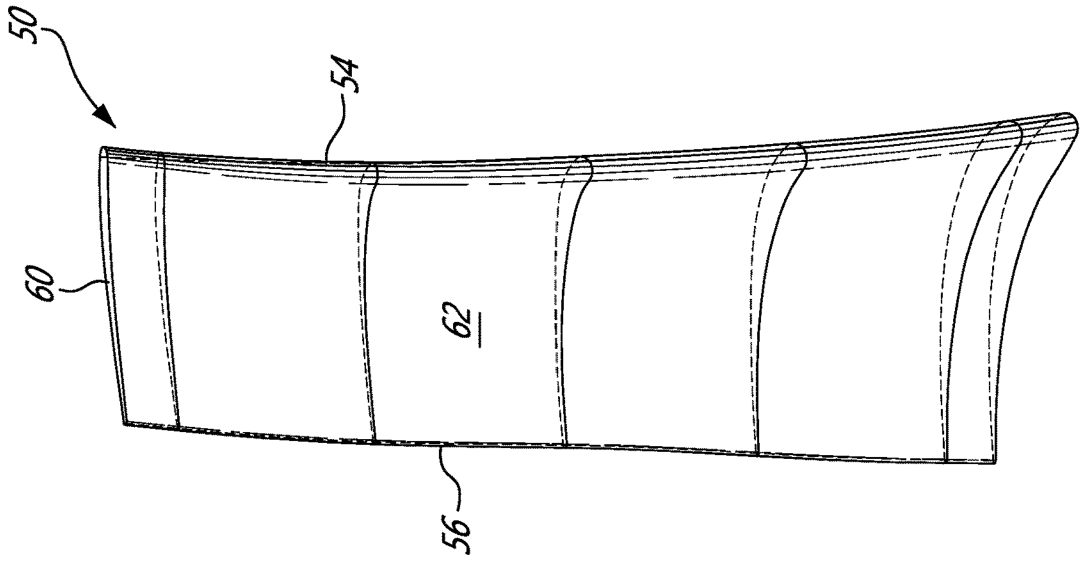
FIG. 4*a* is an isometric view of an exemplary turbine airfoil corresponding to the directional references of FIG. 3*b;*

The external surface 52 of the airfoil 50 generates lift based upon its geometry and direct flow along the gaspath 20. Various views of the airfoil of the second stage low pressure turbine blade 40*a* are shown in FIGS. 4*a*-4*c*. In one example, the second-stage array 38*a* a consists of fifty-one (51) turbine blades 40*a*, but the number may vary according to engine size. The turbine blades can be constructed from a high-strength, heat-resistant material such as a nickel-based or cobalt-based superalloy, or of a high-temperature, stress-resistant ceramic or composite material, for example. In cooled configurations, internal fluid passages and external cooling apertures provide for a combination of impingement and film cooling. In addition, one or more thermal barrier coatings (TBC), abrasion-resistant coatings, and/or other protective coatings may be applied to the turbine blades.

Figure 5:
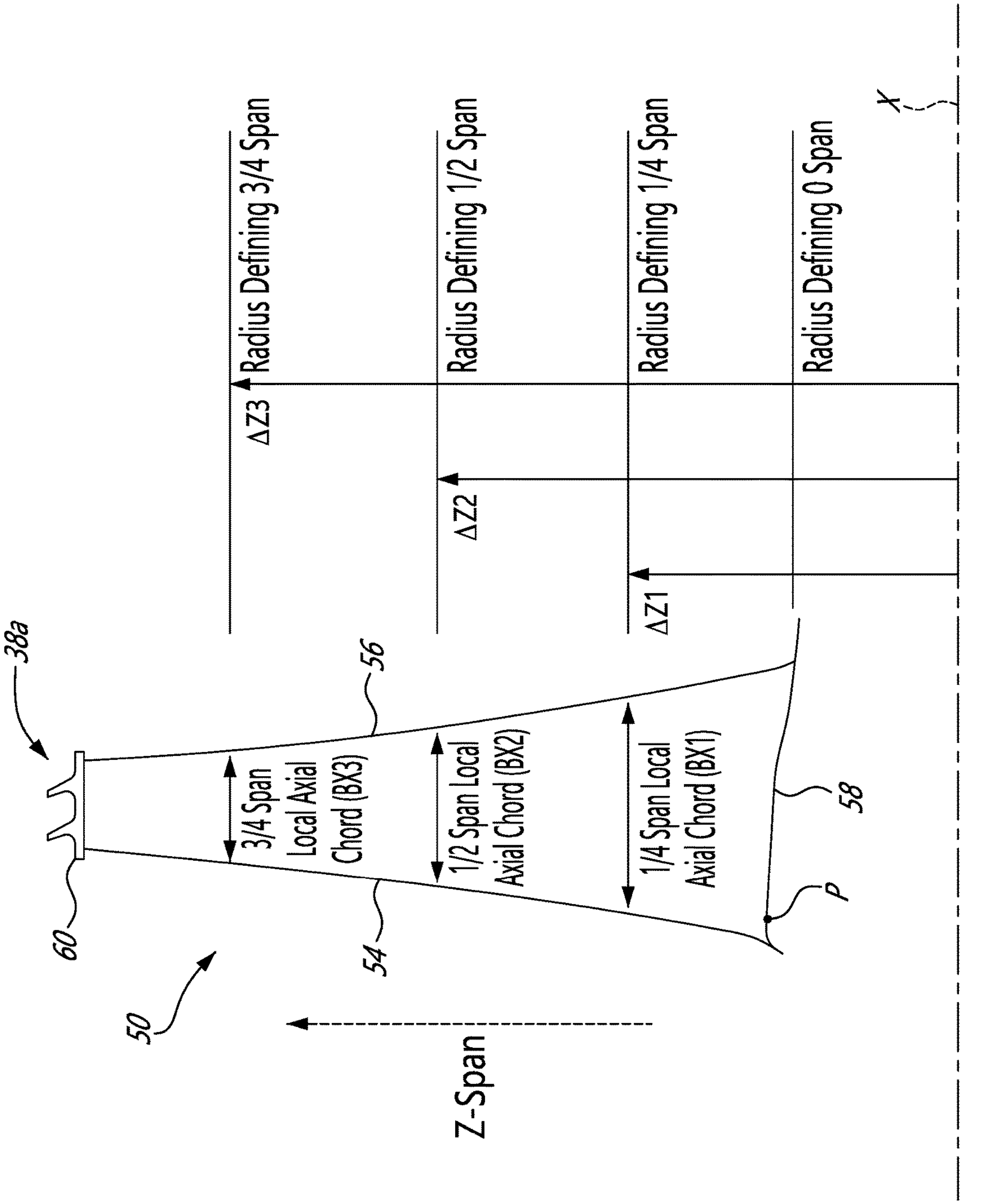
FIG. 5 depicts the span positions and local axial chords referenced in Table 1.

Referring to FIG. 5, the geometries of external surfaces of airfoil are defined in terms of Cartesian coordinates defined along x, y, and z axes, which respectively correspond to the axial (x), circumferential (y), and span/radial (Z-span) (z) directions shown in FIGS. 3*a* and 3*b*. The span coordinate is provided as a radial distance (ΔZ1-ΔZ3) from the rotation axis X of the airfoil 50. The "0" span is taken at a point P where the airfoil 50 meets the platform 58, as schematically illustrated in FIG. 5. The overall or full span is 100% the distance from the point P to the tip 60 in the span direction Z-span. By way of example, the "¼ span" (ΔZ1) is 25% the distance from the point P toward the tip 60 in the span direction Z-span.

The axial (x) and circumferential (y) coordinates are normalized by the local axial chord (Bx) for the 3 given span locations (ΔZ1, ΔZ2, ΔZ3). By way of example, local axial chord (Bx1) for axial (x) and circumferential (y) coordinates associated with the ¼ span (ΔZ1) corresponds to the width of the airfoil 50 between the leading and trailing edges 54, 56 at the ¼ span location (ΔZ1).

The contour of the airfoil is set forth in Table 1, which provides the axial (x) and circumferential (y) coordinates (in inches) scaled by the local axial chord (Bx) for given span locations or positions. 3-D airfoil surfaces are formed by joining adjacent points in Table 1 in a smooth manner and joining adjacent sections or sectional profiles along the span. The manufacturing tolerance relative to the specified coordinates is ±0.050 inches (±1.27 mm). The coordinates define points on a cold, uncoated, stationary airfoil surface at nominal definition, in a plane at the corresponding span positions. Additional elements such as cooling holes, protective coatings, fillets, and seal structures may also be formed onto the specified airfoil surface, or onto an adjacent platform surface, but these elements are not necessarily defined by the normalized coordinates. For example, a variable coating C may be applied between 0.0001 inches (0.003 mm) (trace) and 0.01 inches (0.28 mm) thick. According to one particular embodiment, a constant coating of 0.0015 inches (0.0381 mm) is applied.

TABLE 1

REFERENCE RADIUS: ΔZ1

TABLE 1-continued

| SECTION COORDINATES (X, Y)/BX1 | |
|---|---|
| 0.000 | −0.032 |
| 0.002 | −0.043 |
| 0.005 | −0.053 |
| 0.012 | −0.063 |
| 0.021 | −0.073 |
| 0.032 | −0.081 |
| 0.043 | −0.089 |
| 0.055 | −0.098 |
| 0.075 | −0.110 |
| 0.100 | −0.123 |
| 0.125 | −0.134 |
| 0.150 | −0.144 |
| 0.175 | −0.151 |
| 0.200 | −0.158 |
| 0.225 | −0.162 |
| 0.250 | −0.165 |
| 0.275 | −0.167 |
| 0.300 | −0.168 |
| 0.325 | −0.167 |
| 0.350 | −0.165 |
| 0.375 | −0.161 |
| 0.400 | −0.157 |
| 0.425 | −0.151 |
| 0.450 | −0.144 |
| 0.475 | −0.135 |
| 0.500 | −0.124 |
| 0.525 | −0.112 |
| 0.550 | −0.099 |
| 0.575 | −0.084 |
| 0.600 | −0.067 |
| 0.625 | −0.049 |
| 0.650 | −0.029 |
| 0.675 | −0.007 |
| 0.700 | 0.016 |
| 0.725 | 0.041 |
| 0.750 | 0.067 |
| 0.775 | 0.094 |
| 0.800 | 0.122 |
| 0.825 | 0.152 |
| 0.850 | 0.184 |
| 0.875 | 0.217 |
| 0.900 | 0.252 |
| 0.925 | 0.289 |
| 0.943 | 0.318 |
| 0.959 | 0.344 |
| 0.972 | 0.366 |
| 0.982 | 0.384 |
| 0.988 | 0.396 |
| 0.993 | 0.405 |
| 0.997 | 0.413 |
| 0.999 | 0.418 |
| 1.000 | 0.423 |
| 0.999 | 0.427 |
| 0.997 | 0.430 |
| 0.993 | 0.433 |
| 0.988 | 0.433 |
| 0.982 | 0.429 |
| 0.972 | 0.414 |
| 0.959 | 0.396 |
| 0.943 | 0.374 |
| 0.925 | 0.350 |
| 0.900 | 0.318 |
| 0.875 | 0.288 |
| 0.850 | 0.260 |
| 0.825 | 0.234 |
| 0.800 | 0.211 |
| 0.775 | 0.188 |
| 0.750 | 0.168 |
| 0.725 | 0.148 |
| 0.700 | 0.131 |
| 0.675 | 0.114 |
| 0.650 | 0.098 |
| 0.625 | 0.084 |
| 0.600 | 0.071 |
| 0.575 | 0.058 |
| 0.550 | 0.047 |
| 0.525 | 0.037 |
| 0.500 | 0.027 |

TABLE 1-continued

| | |
|---|---|
| 0.475 | 0.019 |
| 0.450 | 0.011 |
| 0.425 | 0.004 |
| 0.400 | −0.002 |
| 0.375 | −0.007 |
| 0.350 | −0.011 |
| 0.325 | −0.014 |
| 0.300 | −0.017 |
| 0.275 | −0.019 |
| 0.250 | −0.020 |
| 0.225 | −0.020 |
| 0.200 | −0.019 |
| 0.175 | −0.018 |
| 0.150 | −0.015 |
| 0.125 | −0.012 |
| 0.100 | −0.009 |
| 0.075 | −0.005 |
| 0.055 | −0.001 |
| 0.043 | 0.001 |
| 0.032 | 0.001 |
| 0.021 | −0.002 |
| 0.012 | −0.008 |
| 0.005 | −0.016 |
| 0.002 | −0.023 |
| REFERENCE RADIUS: ΔZ2<br>SECTION COORDINATES (X, Y)/BX2 | |
| 0.000 | −0.127 |
| 0.002 | −0.134 |
| 0.005 | −0.145 |
| 0.012 | −0.158 |
| 0.021 | −0.169 |
| 0.032 | −0.178 |
| 0.043 | −0.186 |
| 0.055 | −0.194 |
| 0.075 | −0.205 |
| 0.100 | −0.217 |
| 0.125 | −0.227 |
| 0.150 | −0.234 |
| 0.175 | −0.239 |
| 0.200 | −0.242 |
| 0.225 | −0.244 |
| 0.250 | −0.243 |
| 0.275 | −0.241 |
| 0.300 | −0.237 |
| 0.325 | −0.231 |
| 0.350 | −0.224 |
| 0.375 | −0.214 |
| 0.400 | −0.203 |
| 0.425 | −0.190 |
| 0.450 | −0.175 |
| 0.475 | −0.158 |
| 0.500 | −0.140 |
| 0.525 | −0.119 |
| 0.550 | −0.097 |
| 0.575 | −0.073 |
| 0.600 | −0.047 |
| 0.625 | −0.020 |
| 0.650 | 0.008 |
| 0.675 | 0.037 |
| 0.700 | 0.068 |
| 0.725 | 0.099 |
| 0.750 | 0.131 |
| 0.775 | 0.164 |
| 0.800 | 0.199 |
| 0.825 | 0.234 |
| 0.850 | 0.271 |
| 0.875 | 0.309 |
| 0.900 | 0.350 |
| 0.925 | 0.394 |
| 0.943 | 0.427 |
| 0.959 | 0.457 |
| 0.972 | 0.483 |
| 0.982 | 0.505 |
| 0.988 | 0.518 |
| 0.993 | 0.529 |
| 0.997 | 0.538 |
| 0.999 | 0.543 |
| 1.000 | 0.549 |

TABLE 1-continued

| | |
|---|---|
| 0.999 | 0.553 |
| 0.997 | 0.557 |
| 0.993 | 0.560 |
| 0.988 | 0.562 |
| 0.982 | 0.561 |
| 0.972 | 0.548 |
| 0.959 | 0.527 |
| 0.943 | 0.501 |
| 0.925 | 0.471 |
| 0.900 | 0.430 |
| 0.875 | 0.390 |
| 0.850 | 0.352 |
| 0.825 | 0.316 |
| 0.800 | 0.282 |
| 0.775 | 0.251 |
| 0.750 | 0.222 |
| 0.725 | 0.194 |
| 0.700 | 0.169 |
| 0.675 | 0.145 |
| 0.650 | 0.123 |
| 0.625 | 0.103 |
| 0.600 | 0.084 |
| 0.575 | 0.066 |
| 0.550 | 0.049 |
| 0.525 | 0.033 |
| 0.500 | 0.019 |
| 0.475 | 0.005 |
| 0.450 | −0.008 |
| 0.425 | −0.019 |
| 0.400 | −0.030 |
| 0.375 | −0.040 |
| 0.350 | −0.050 |
| 0.325 | −0.058 |
| 0.300 | −0.066 |
| 0.275 | −0.072 |
| 0.250 | −0.078 |
| 0.225 | −0.083 |
| 0.200 | −0.087 |
| 0.175 | −0.089 |
| 0.150 | −0.091 |
| 0.125 | −0.091 |
| 0.100 | −0.089 |
| 0.075 | −0.086 |
| 0.055 | −0.083 |
| 0.043 | −0.084 |
| 0.032 | −0.086 |
| 0.021 | −0.090 |
| 0.012 | −0.096 |
| 0.005 | −0.105 |
| 0.002 | −0.113 |

REFERENCE RADIUS: ΔZ3
SECTION COORDINATES (X, Y)/BX3

| | |
|---|---|
| 0.000 | −0.288 |
| 0.002 | −0.303 |
| 0.005 | −0.311 |
| 0.012 | −0.323 |
| 0.021 | −0.333 |
| 0.032 | −0.342 |
| 0.043 | −0.348 |
| 0.055 | −0.354 |
| 0.075 | −0.360 |
| 0.100 | −0.367 |
| 0.125 | −0.371 |
| 0.150 | −0.372 |
| 0.175 | −0.373 |
| 0.200 | −0.370 |
| 0.225 | −0.366 |
| 0.250 | −0.359 |
| 0.275 | −0.351 |
| 0.300 | −0.340 |
| 0.325 | −0.328 |
| 0.350 | −0.312 |
| 0.375 | −0.295 |
| 0.400 | −0.275 |
| 0.425 | −0.253 |
| 0.450 | −0.228 |
| 0.475 | −0.201 |
| 0.500 | −0.171 |

TABLE 1-continued

| | |
|---|---|
| 0.525 | −0.139 |
| 0.550 | −0.105 |
| 0.575 | −0.070 |
| 0.600 | −0.032 |
| 0.625 | 0.007 |
| 0.650 | 0.047 |
| 0.675 | 0.088 |
| 0.700 | 0.130 |
| 0.725 | 0.174 |
| 0.750 | 0.218 |
| 0.775 | 0.264 |
| 0.800 | 0.311 |
| 0.825 | 0.359 |
| 0.850 | 0.408 |
| 0.875 | 0.459 |
| 0.900 | 0.512 |
| 0.925 | 0.567 |
| 0.943 | 0.607 |
| 0.959 | 0.643 |
| 0.972 | 0.674 |
| 0.982 | 0.698 |
| 0.988 | 0.712 |
| 0.993 | 0.725 |
| 0.997 | 0.735 |
| 0.999 | 0.741 |
| 1.000 | 0.749 |
| 0.999 | 0.753 |
| 0.997 | 0.757 |
| 0.993 | 0.761 |
| 0.988 | 0.763 |
| 0.982 | 0.764 |
| 0.972 | 0.760 |
| 0.959 | 0.738 |
| 0.943 | 0.709 |
| 0.925 | 0.674 |
| 0.900 | 0.622 |
| 0.875 | 0.568 |
| 0.850 | 0.515 |
| 0.825 | 0.463 |
| 0.800 | 0.414 |
| 0.775 | 0.367 |
| 0.750 | 0.324 |
| 0.725 | 0.282 |
| 0.700 | 0.244 |
| 0.675 | 0.207 |
| 0.650 | 0.173 |
| 0.625 | 0.141 |
| 0.600 | 0.110 |
| 0.575 | 0.081 |
| 0.550 | 0.053 |
| 0.525 | 0.027 |
| 0.500 | 0.002 |
| 0.475 | −0.022 |
| 0.450 | −0.045 |
| 0.425 | −0.066 |
| 0.400 | −0.086 |
| 0.375 | −0.105 |
| 0.350 | −0.123 |
| 0.325 | −0.140 |
| 0.300 | −0.155 |
| 0.275 | −0.170 |
| 0.250 | −0.183 |
| 0.225 | −0.195 |
| 0.200 | −0.205 |
| 0.175 | −0.214 |
| 0.150 | −0.222 |
| 0.125 | −0.228 |
| 0.100 | −0.232 |
| 0.075 | −0.235 |
| 0.055 | −0.238 |
| 0.043 | −0.242 |
| 0.032 | −0.247 |
| 0.021 | −0.254 |
| 0.012 | −0.262 |
| 0.005 | −0.271 |
| 0.002 | −0.282 |

This set of points represents a novel and unique solution to the target design criteria mentioned herein above, and are well-adapted for use in the first, second, third, fourth or fifth stage of an LP turbine. For instance, the blade airfoil defined by the coordinates in table 1 could be used in the second LP turbine blade array 38*a* of exemplified engine 10. According to at least some embodiments, the turbine airfoil profile is particularly configured to improve the service life of the second stage LP turbine blades 40*a*.

In general, the turbine blade airfoil, as described herein, has a combination of axial sweep and tangential lean. Depending on configuration, the lean and sweep angles sometimes vary by up to ±10° or more. In addition, the turbine blade is sometimes rotated with respect to a radial axis or a normal to the platform or shroud surface, for example, by up to ±10° or more.

Novel aspects of the turbine blade and associated airfoil surfaces described herein are achieved by substantial conformance to specified geometries. Substantial conformance generally includes or may include a manufacturing tolerance of ±0.05 inches (±1.27 mm), in order to account for variations in molding, cutting, shaping, surface finishing and other manufacturing processes, and to accommodate variability in coating thicknesses. This tolerance is generally constant or not scalable, and applies to each of the specified blade surfaces, regardless of size.

Substantial conformance is based on sets of points representing a three-dimensional surface with particular physical dimensions, for example, in inches or millimeters, as determined by selecting particular values of the scaling parameters. A substantially conforming airfoil, blade or, or vane structure has surfaces that conform to the specified sets of points, within the specified tolerance.

Alternatively, substantial conformance is based on a determination by a national or international regulatory body, for example, in a part certification or part manufacture approval (PMA) process for the Federal Aviation Administration, the European Aviation Safety Agency, the Civil Aviation Administration of China, the Japan Civil Aviation Bureau, or the Russian Federal Agency for Air Transport. In these configurations, substantial conformance encompasses a determination that a particular part or structure is identical to, or sufficiently similar to, the specified airfoil, blade, or vane, or that the part or structure complies with airworthiness standards applicable to the specified blade, vane, or airfoil. In particular, substantial conformance encompasses any regulatory determination that a particular part or structure is sufficiently similar to, identical to, or the same as a specified blade, vane, or airfoil, such that certification or authorization for use is based at least in part on the determination of similarity.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, the present disclosure includes several aspects and embodiments that include particular features. Although these particular features may be described individually, it is within the scope of the present disclosure that some or all of these features may be combined with any one of the aspects and remain within the scope of the present disclosure. Yet further modifications could be implemented by a person of ordinary skill in the art in view of the present disclosure, which modifications would be within the scope of the present technology.

The invention claimed is:

1. A turbine blade for a gas turbine engine, the turbine blade comprising:

an airfoil having a leading edge and a trailing edge joined by a pressure side and a suction side to provide an external airfoil surface extending from a platform in a spanwise direction to a tip; and wherein the external airfoil surface is formed in substantial conformance with cross-section profiles of the airfoil defined by a set of Cartesian coordinates set forth in Table 1, the set of Cartesian coordinates provided by an axial coordinate scaled by a local axial chord, a circumferential coordinate scaled by the local axial chord, and a span location, wherein the local axial chord corresponds to a width of the airfoil between the leading edge and the trailing edge at the span location.

2. The turbine blade according to claim 1, wherein the airfoil is a low pressure turbine blade.

3. The turbine blade according to claim 1, wherein the airfoil is a first-stage, second-stage, third-stage, fourth-stage or a fifth-stage low pressure turbine blade.

4. The turbine blade according to claim 1, wherein the span location corresponds to a distance from a rotation axis of the airfoil.

5. The turbine blade according to claim 1, wherein the external airfoil surface is formed in conformance with the cross-section profiles of the airfoil defined by the set of Cartesian coordinates set forth in Table 1 to a tolerance of ±0.050 inches (±1.27 mm).

6. The turbine blade according to claim 1, wherein the external airfoil surface is a cold, uncoated airfoil surface at nominal definition.

7. The turbine blade according to claim 6, further comprising a coating over the external airfoil surface.

8. A low pressure turbine blade comprising:

a platform; and an airfoil extending in a spanwise direction from the platform to a tip, the airfoil having an external airfoil surface formed in substantial conformance with cross-section airfoil profiles defined by a set of Cartesian coordinates set forth in Table 1.

9. The low pressure turbine blade according to claim 8, wherein the set of Cartesian coordinates in Table 1 have Cartesian coordinate values provided in inches for a cold uncoated condition at nominal definition.

10. The low pressure turbine blade according to claim 8, wherein the tip is shrouded.

11. The low pressure turbine blade according to claim 8, wherein the external airfoil surface is formed in conformance with the cross-section profiles of the airfoil defined by the set of Cartesian coordinates set forth in Table 1 to a tolerance of ±0.050 inches (±1.27 mm).

12. The low pressure turbine blade according to claim 9, further comprising a coating over the external airfoil surface.

13. A gas turbine engine comprising:

a low pressure (LP) turbine configured to drive a low pressure compressor;

wherein the LP turbine comprises at least one stage of turbine blades, wherein at least one of the turbine blades of the at least one stage comprises an airfoil having leading and trailing edges joined by spaced-apart pressure and suction sides to provide an external airfoil surface extending from a platform in a span direction to a tip; and wherein the external airfoil surface is formed in substantial conformance with cross-section profiles of the airfoil defined by a set of Cartesian coordinates set forth in Table 1, the set of Cartesian coordinates provided by an axial coordinate scaled by a local axial chord, a circumferential coordinate scaled by the local axial chord, and a span location, wherein the local axial chord corresponds to a width of the airfoil between the leading and trailing edges at the span location.

14. The gas turbine engine according to claim 13, wherein the span location corresponds to a distance from a rotation axis of the airfoil.

15. The gas turbine engine according to claim 13, wherein the external airfoil surface is formed in conformance with the cross-section profiles of the airfoil defined by the set of Cartesian coordinates set forth in Table 1 to a tolerance of ±0.050 inches (±1.27 mm).

16. The gas turbine engine according to claim 13, wherein the exterior airfoil surface is a cold, uncoated airfoil surface at nominal definition.

17. The gas turbine engine according to claim 13, wherein the at least one stage of turbine blades includes between 1 to 5 stages, and wherein at least one of the 1 to 5 stages comprises the at least one of the turbine blades.

18. The gas turbine engine according to claim 17, wherein the at least one of the turbine blades is a second stage LP turbine blade.

19. The gas turbine engine according to claim 13, wherein the at least one stage of turbine blades includes an array of fifty-one (51) turbine airfoils.

20. The gas turbine engine according to claim 13 wherein the gas turbine engine is a turboprop or a turboshaft engine having 1 to 3 independently rotatable spools.

* * * * *